United States Patent
Chen et al.

(10) Patent No.: US 7,173,937 B1
(45) Date of Patent: Feb. 6, 2007

(54) INTELLIGENT ADDRESS REGISTRATION FOR OPTICAL USER-NETWORK INTERFACE

(75) Inventors: Wenfeng Chen, Kanata (CA); Borong Zhou, Ottawa (CA); Guo Qiang Wang, Nepean (CA); Randy Kuang, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1092 days.

(21) Appl. No.: 10/106,366

(22) Filed: Mar. 27, 2002

(51) Int. Cl.
*H04L 12/56* (2006.01)
(52) U.S. Cl. .................. 370/397; 370/401; 370/409
(58) Field of Classification Search ............ None
See application file for complete search history.

(56) References Cited

U.S. PATENT DOCUMENTS 6,115,392 A * 9/2000 Nomura ............... 370/466
6,456,631 B1 * 9/2002 Nomura ............... 370/466
7,027,731 B1 * 4/2006 Wang et al. ............ 398/45
2002/0126357 A1 * 9/2002 Ryumkin ............... 359/165

* cited by examiner

*Primary Examiner*—Doris H. To
*Assistant Examiner*—Soon D. Hyun
(74) *Attorney, Agent, or Firm*—Hunton & Williams LLp (57) ABSTRACT

A technique for address registration and resolution is disclosed. In one embodiment, the technique is realized by an address registration and resolution service that is applicable to in-band in-fiber, out-of-band in-fiber and out-of-band out-of-fiber O-UNI signaling configurations. Through this address registration and resolution scheme, an optical service subscriber or optical access service provider can register various client-layer addresses (i.e., establish an association between the client addresses and the optical network points of attachment for the network intelligence.) An intelligent optical routing protocol will propagate this information all over the network and use this information to locate a corresponding optical client device and the optical network point of attachment. The optical network signaling can then perform the network internal signaling for on-demand optical service provisioning.

17 Claims, 7 Drawing Sheets

INTELLIGENT ADDRESS REGISTRATION FOR OPTICAL USER-NETWORK INTERFACE

FIELD OF THE INVENTION

The present invention relates generally to address registration and, more particularly, to a technique for intelligent address registration for optical user network interfaces.

BACKGROUND OF THE INVENTION

The address registration and resolution protocol of the present state of the art developed by the industrial standard forum (Optical Interworking Forum) assumes the presence of an in-band or in-fiber Optical User-Network Interface (O-UNI) signaling configuration. In this configuration, each signaling channel is physically associated with an optical data link or channel. Additionally, a known type of address registration request contains only a client-layer address to be registered on a corresponding optical network point of attachment. The point of attachment is determined from the signaling channel to data link or data channel association.

Although the above-described approach may appear simple, even if the necessary signaling configuration is present, the approach is rigid, costly and incapable of handling client-layer addresses assigned to channels or sub-channels. Furthermore, many photonic switches and optical add-drop multiplexers do not have in-band or in-fiber signaling capability. Therefore, the address registration information contained in the current protocols is not sufficient to establish the desired address association. Consequently, the current solutions do not work in third-party signaling O-UNI service invocation configurations. The cost to adopt in-band and in-fiber signaling capability in an Optical Network Element (ONE) and client devices can be extremely high. Even with in-band or in-fiber signaling, the current address registration protocol can at most allow a client-layer address to be assigned to a specific channel but not a sub-channel.

In view of the foregoing, it would be desirable to provide a technique for address registration that overcomes the above-described inadequacies and shortcomings. More particularly, it would be desirable to provide a technique for address registration in an efficient and cost effective manner.

SUMMARY OF THE INVENTION

According to the present invention, a technique for address registration and resolution is provided.

In accordance with an aspect of this exemplary embodiment of the present invention, a method for intelligent address registration within an optical network is provided. The method comprises the steps of: sending a registration request from a client-side optical user-network interface agent to a network-side optical user-network interface agent, wherein the registration request includes a client layer address to be registered and an identity of an addressable entity; checking the registration request with the network-side optical user-network interface agent and creating an association by establishing at least one optical network administered (ONA) address corresponding to the client layer address; and forwarding the association to an optical network intelligent routing protocol for distribution over the network. The ONA address is assigned to a network point of attachment (e.g., a data link port one the ONE connecting to a client device). The optical network uses this ONA address for routing and signaling purposes. In late OIF specifications, this type of address renamed as Transport Network Assigned or TNA address. In the exemplary embodiment of the present invention, the term ONA is used interchangeably with TNA.

In accordance with further aspects of this exemplary embodiment of the present invention, an apparatus is provided for performing address registration and resolution for an optical network. The optical network comprises at least an optical network element and a client device. The apparatus comprises a client-side optical user-network interface agent having tools for formulating and forwarding an address request containing a client layer address associated with the client device and an identity of an addressable entity associated with the optical network element. The apparatus further comprises a network-side optical user-network interface agent capable of receiving the request from the client-side optical user-network interface agent and formulating an address association based on the request and forwarding the address association. The apparatus additionally comprises an optical network intelligent routing protocol capable of receiving the address association formulated by the network-side optical user-network interface agent and propagating the address association.

With the technique of the invention, an address resolves to any of a variety of addresses on the client side, thus accommodating different standards. The accommodation of different standards facilitates use of a network-to-network interface and traffic across international boundaries.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
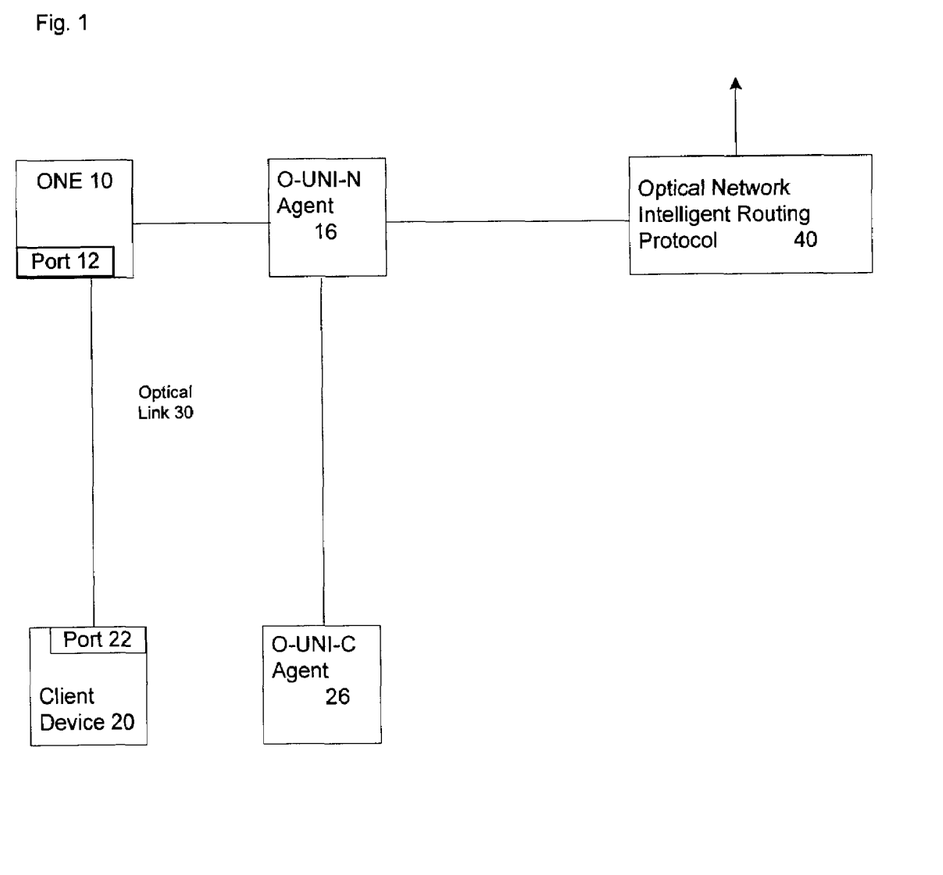
FIG. 1 is a block diagram illustrating a system for implementing a technique in accordance with an embodiment of the present invention.

In one exemplary embodiment, the technique is realized by a novel addressing registration and resolution scheme for an optical user-network interface. As shown in FIG. 1, an optical user-network interface 1 is composed of an Optical Network Element (ONE) 10 (e.g., an optical cross-connect (OXC) or an optical add-drop multiplexer (OADM)), an optical client device 20 (e.g., an optical access switch or an IP router) and the optical links 30 connecting them together. Generally speaking, the ONE 10 and the client device 20 belong to different administrative domains and serve different purposes. A port 22 on the client device 20 and a port 12 on the ONE 10 are assigned different types of addresses. The port 12 on the ONE 10 is identified by an optical network administered (ONA) address, which is an IPv4 address administered internally in the optical network, or by an ONA IP address along with an index that indicates a port in the ONE 10 that supports the point of attachment. On the client device 20, the port 22 can be assigned one or more client-layer addresses of the following types:

1. IPv4 address (32 bits);
2. IPv6 address (128 bits);
3. ITU-T E.164 ATM End System Address (AESA) (160 bits);
4. British Standards Institute ICD AESA (160 bits);
5. ANSI DCC AESA (160 bits); and
6. NSAP address (160-bits).

Address registration is initiated by a client-side optical user-network interface (O-UNI-C) agent 26 to associate the client-layer address of the port 22 on the client device 20 to an optical network administered address of the port 12 on the ONE 10. With this association propagated over the optical network control plane, a remote peer optical client can query a network-side optical user-network interface (O-UNI-N) agent 16 for the ONA address associated to a given client-layer address (and therefore the client device 20). This process is called address resolution. On the basis of address registration and resolution, on-demand automatic optical connection service can be provided via optical user-network interface (O-UNI) signaling and an optical network internal signaling protocol that relies on the ONA address to identify the relevant optical network points of attachment or user-network interface ports.

When the ONE 10 and the optical client device 20 are connected together, the two ends of the optical data link 30 need to be configured with the knowledge about local and remote nodes, including the association between the identities of the addressable entities (ports, channels and sub-channels, if applicable). An alternative to this manual configuration is to let the client device 20 and the ONE 10 execute a neighbor discovery protocol, which generates the necessary configuration information from running link tests over the data bearing link(s). Subsequently, an optical network administered address (ONA address) should be assigned to each of the data link ports on the ONE side. Alternatively, a data link port may be identified by the combination of an ONA address and an index number.

Therefore, depending on data link granularity, the following association information will be ready before the address registration service is enabled:

The 1-to-1 identifier mappings
(Client ID: Client Port ID<<ONE Port ID), and (if applicable)
(Client ID: Client Port ID: Channel ID<<ONE Port ID: Channel ID), and (if applicable)
(Client ID: Client Port ID: Channel ID: Sub-channel ID<<ONE Port ID: Channel ID: Sub-channel ID)
The 1-to-1 ONE port to ONA address mappings
(ONE Port ID<<ONA address)

The client ID is optional for direct service invocation and third-party signaling configuration if the proxy O-UNI-C serves only one optical client device 20 in the second case. When one proxy O-UNI-C operates on behalf of multiple clients, this identifier must present. The port, channel and sub-channel IDs are locally unique to the client device 20 (or ONE 10). The IDs may be either integer indexes or character strings. If the ONE point of attachment or port 12 is identified by the ONE node ONA address and a port index, then the ONE port 12 is mapped to the ONA address.

Figure 2:
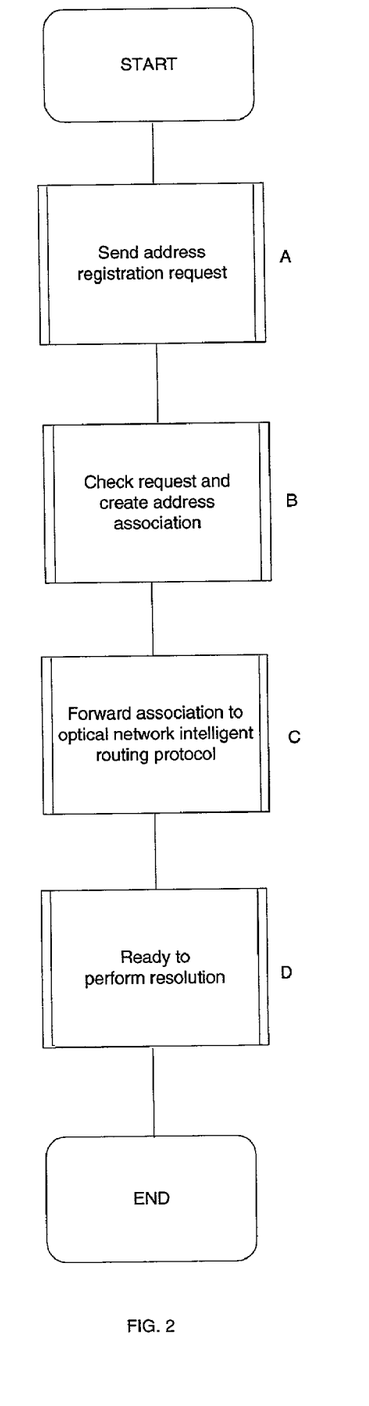
FIG. 2 is a flow chart illustrating the main procedures involved in an embodiment of an address registration and resolution technique of the invention.

FIGS. 2–7 are flow charts illustrating aspects of an address registration and resolution technique of the invention. As shown in FIG. 2, in procedure A, the O-UNI-C 26 sends an address registration request to the O-UNI-N 16. In procedure B, the O-UNI-N 16 checks the request and creates an address association. In procedure C, the O-UNI-N 16 forwards the association to the optical network intelligent routing protocol 40. In procedure D, resolution is performed upon an inquiry from a remote peer.

Figure 3:
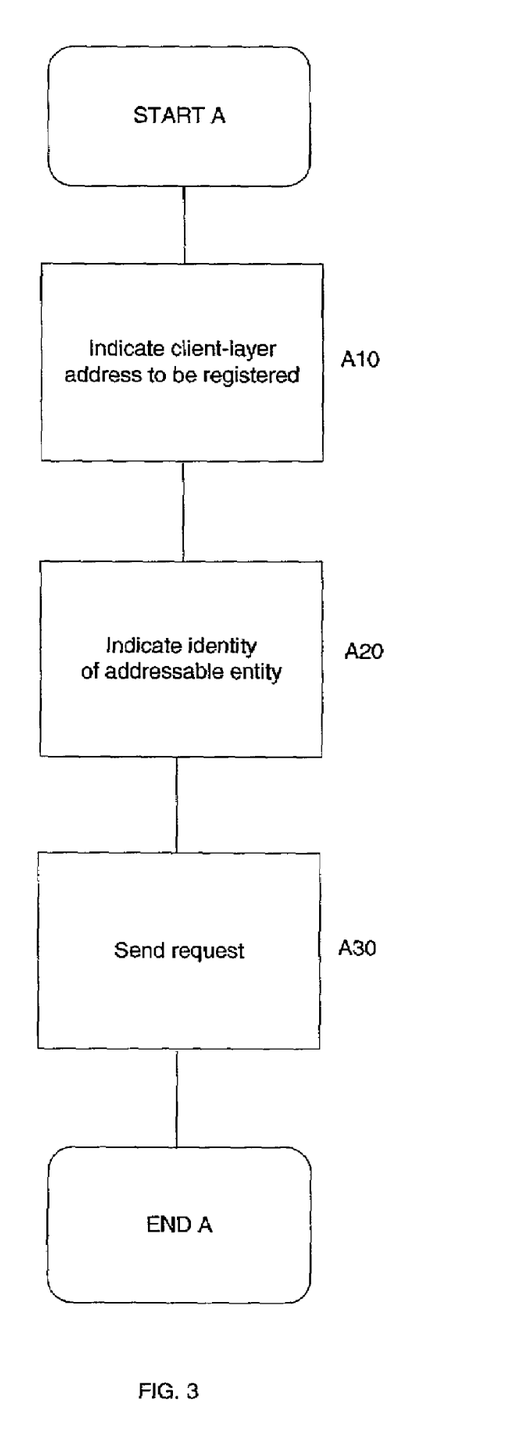
FIG. 3 is a flow chart illustrating the details of the procedure for sending an address registration request in accordance with an embodiment of the present invention.

FIG. 3 illustrates the details of procdure A for sending an address registration request. In step A10, the O-UNI-C 26 indicates a client layer address to be registered. In step A20, the O-UNI-C 26 indicates the local identity of the addressable entity and sends the request containing the client layer address and the addressable entity in step A30.

The registration and resolution protocol disclosed herein is universally applicable with regard to the various O-UNI signaling configurations and optical service invocation models. The address registration protocol of the invention adds a piece of essential information into the address registration request sent by the O-UNI-C 26 to the O-UNI-N 16. The modified address registration request now contains
the client-layer address to be registered, and
the identity of the addressable entity on the client side.

The identity may take one of the following forms:
Client ID: Client Port ID;
Client ID: Client Port ID: Channel ID; or
Client ID: Client Port ID: Channel ID: Sub-channel ID.

The client ID is optional in some systems. For instance, the client ID is unnecessary for a direct service invocation model or in a structure in which a proxy UNI-C serves only one client device 20 in the third-party signaling configuration. In these cases, the identity of the O-UNI session implicitly identifies the client device 20.

Figure 4:
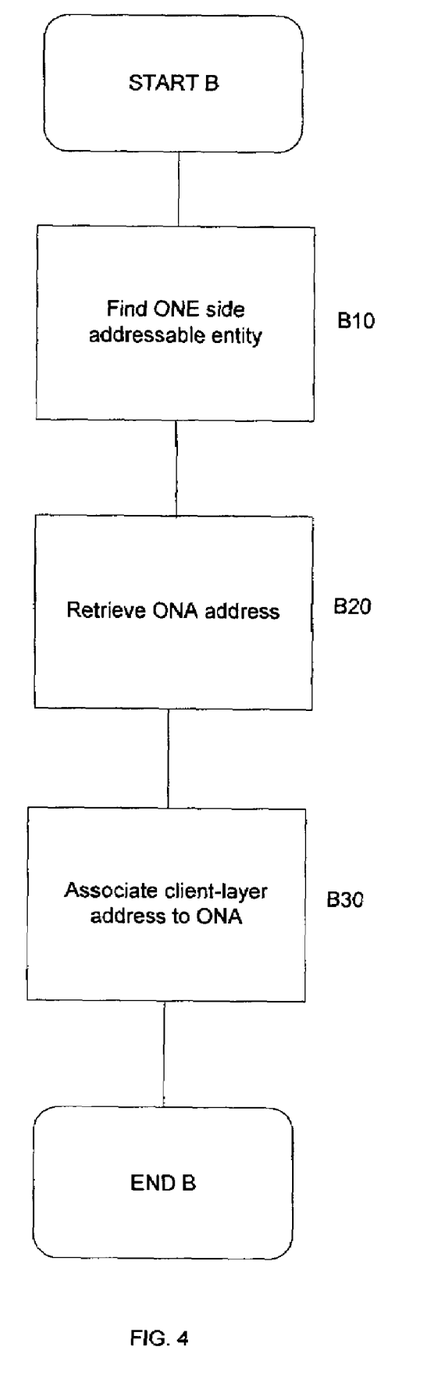
FIG. 4 is a flow chart illustrating the details of a procedure for creating an address association in accordance with an embodiment of the present invention.

FIG. 4 illustrates the details of procedure B for checking the request and creating an address association. At the O-UNI-N 16, the address registration request is checked against certain policies and an association between the client-layer address and the corresponding ONA address is established.

In step B10, from the identity of the client side addressable entity (port, channel or sub-channel), the corresponding ONE side addressable entity is found. Consequently, in step B20, the ONA address assigned to the corresponding ONE port 12 is retrieved.

In step B30, the client-layer address advertised in the address registration request is associated to the ONA address, creating an m-to-1 mapping (m>1), to allow one optical network point of attachment to be associated with multiple client-layer addresses.

{client-layer address #1, client-layer address #2, . . . client-layer address #m}® ONA address #1

Figure 5:
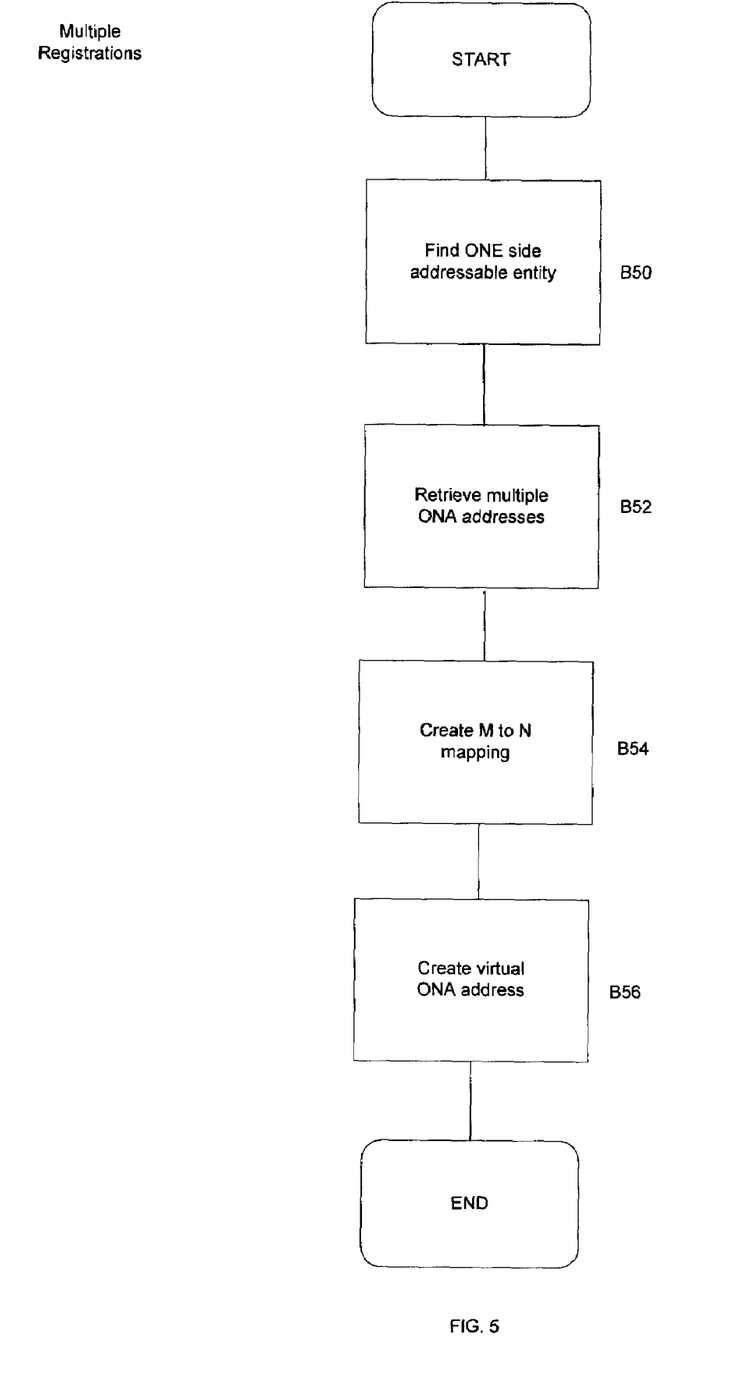
FIG. 5 is a flow chart illustrating the details of a procedure for creating multiple associations for a single addressable entity in accordance with an embodiment of the present invention.

FIG. 5 illustrates an alternative embodiment of procedure B for creating an address association. In this alternative embodiment, one client-layer address is associated with multiple optical network points of attachments or ports.

In step B50, from the identity of the client side addressable entity (port, channel or sub-channel), the corresponding ONE side addressable entity is found. Consequently, in step B52, multiple ONA addresses assigned to the corresponding ONE port 16 is retrieved. This allows flexible management of optical service access bandwidth and client-layer address space. In addition, it enables protection of optical access links.

In step B54, an m to n mapping is created. A scalability issue will arise since m>1 and n>1, representing the number of client-layer addresses and the number of network points of attachment (ONA addresses).

In step B56, in order to maintain the scalability of the address registration process, a virtual ONA address will be created to represent the group of n ONA addresses the m client-layer addresses are associated. Therefore, the amount of address registration information propagated into the optical network is reduced to linearly increase with the number of client addresses registered but not the number of associations made between the client-layer addresses and the ONA addresses. The client-layer multi-addressing is limited within one user-network interface. In other words, one client-layer address can only be associated with multiple ONA addresses belonging to the same optical user-network interface.

After one of the above described embodiments of procedure B is performed, the O-UNI-N 16 forwards the association to the optical network intelligent routing protocol 40 in procedure C. Once a client-layer address is registered, the optical network intelligent routing protocol 40 learns the client-layer address and ONA address association. The optical network intelligent routing protocol 40 propagates this association to all of its peers in the ONE control planes in the network.

In procedure D, Peer client devices 20 can query for the address associations following certain rules (e.g., addresses belong to the same user group). Procedure D is therefore the resolution step.

Figure 6:
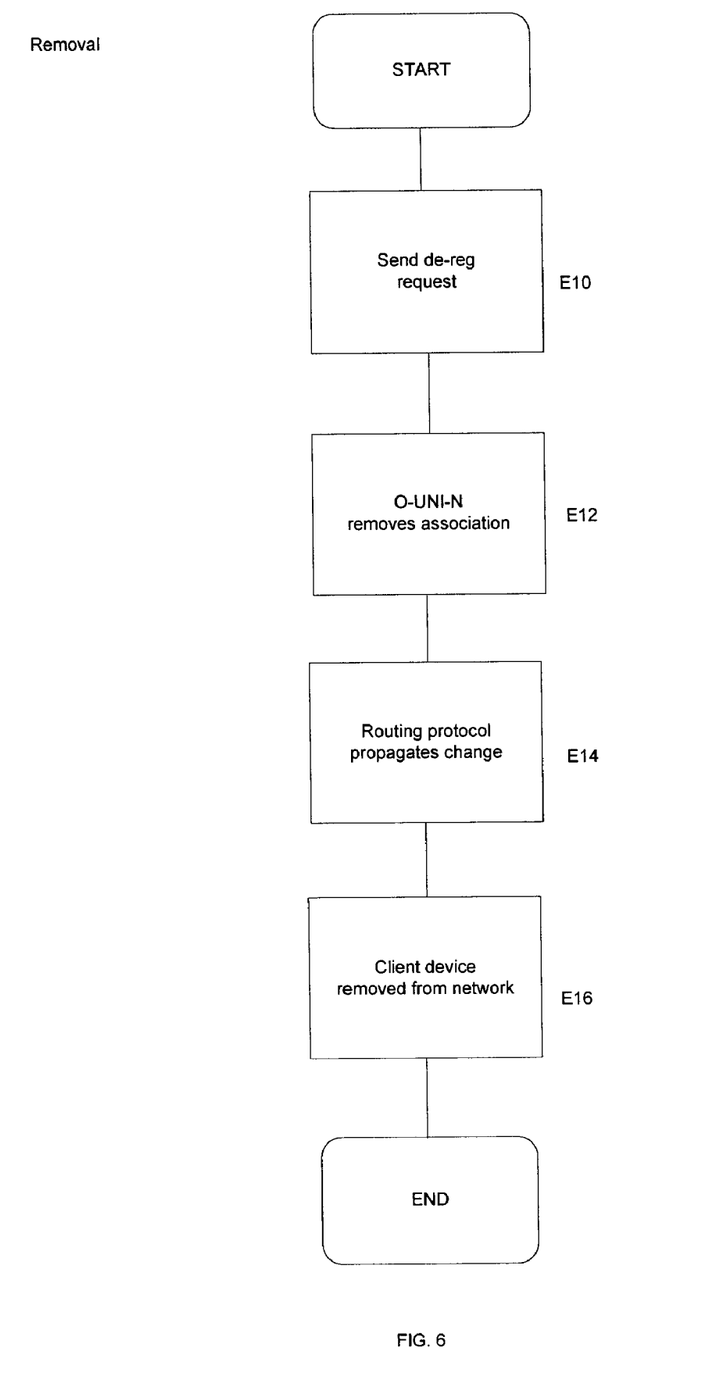
FIG. 6 is a flow chart illustrating the details of a procedure for removing a client address from a network in accordance with an embodiment of the present invention.

In some instances, it will be desirable to remove a client from the network. FIG. 6 illustrates the process of address removal. In order to remove a client-layer address, the O-UNI-C 26 sends an address deregistration request to the O-UNI-N 16 in step E10. The request bears the client-layer address to be de-registered. The O-UNI-N will remove the address association in its record in step E12. In step E14, the intelligent optical routing protocol 40 propagates this change all over the network.

The same client-layer address may be registered through a different client or client user-network interface. All the client-layer addresses assigned to a client device 20 should be deregistered before the client device 20 can be detached from the network in step E16. The client device 20 may be moved to a different location and connected to other ONES. The address registration scheme illustrated herein fully supports the portability of client device 20 and client-layer address.

Figure 7:
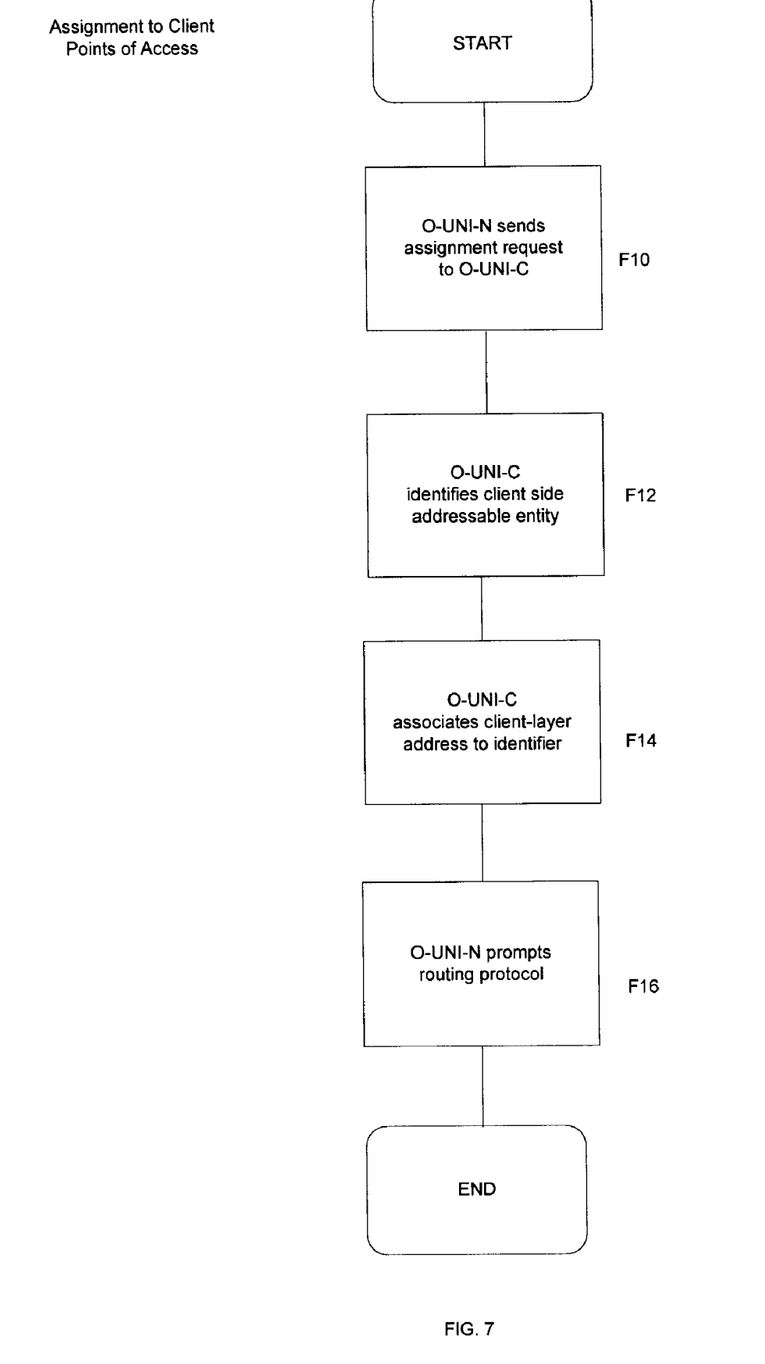
FIG. 7 is a flow chart illustrating the details of a procedure for assignment to client points of access in accordance with an embodiment of the present invention.

FIG. 7 illustrates an extension to the client-ONE address registration service which allows the network to assign client-layer addresses to the client points of access. The client points or access are defined as the minimum addressable entities of the user-network interface at the client-side. During this network address assignment process, in step F10, the O-UNI-N sends an address assignment request to the O-UNI-C, bearing the client-layer address to be assigned and the identity of the associated addressable entity at the ONE side.

In step F12, the O-UNI-C identifies the corresponding client side addressable entity from the aforementioned 1-to-1 identifier mappings.

In step F14, the O-UNI-C associates the advertised client-layer address to the client side identifier (port, channel or sub-channel ID).

Finally, in step F16, once the address assignment is completed, the O-UNI-N will prompt the network routing protocol to propagate the address association all over the network. A remote peer client may then query for the address association and perform appropriate operations.

Various policies for assignment of the client-layer addresses may be utilized, but are not covered in this disclosure. This scheme may serve as the count-part of RARP (Reverse Address Resolution Protocol) or DHCP (Dynamic Host Configuration Protocol) in the optical networking area.

This invention provides a plug-and-play intelligent optical networking solution. End-to-end intelligence is readily built into low-cost photonic switch networks to provide easy access to optical services. Optical access service providers can use this protocol to flexibly manage the client address spaces they are assigned to. A carrier's carrier service or bandwidth whole-sale service is easily supported when the optical access service provider registers multiple client-layer addresses, which may be of the same type or of different types. The technique allows:

Interconnections of high capacity networks: IP network, SONET networks, ATM networks, optical LANs/WANs;

Dynamic connection of optical client (networks) by optical service subscribers or optical access service providers;

Client address and client device portability;

Multiple levels of client-layer address granularity;

Protection of optical access links; and

Scalability.

Accordingly, the invention disclosed herewith provides a solution for an address registration and resolution service that is applicable to in-band in-fiber, out-of-band in-fiber and out-of-band out-of-fiber O-UNI signaling configurations. This scheme allows flexible, dynamic and portable optical client addressing. Through this address registration and resolution scheme, an optical service subscriber or optical access service provider can register various client-layer addresses (i.e., establish an association between the client addresses and the optical network points of attachment for the network intelligence.) An intelligent optical routing protocol can propagate this information all over the network and use this information to locate a corresponding optical client device and the optical network point of attachment. The optical network signaling can then perform the network internal signaling for on-demand optical service provisioning. Targeted at out-of-band signaling configurations, this scheme removes the dependency on the physical association assumed between the O-UNI signaling channel and the optical data links. When applied to in-fiber signaling configurations, this approach reduces the system complexity and reduces hardware and software costs. Flexibility in associating multiple client layer addresses of different types to one optical network point of attachment provides a solution for carriers and optical access service providers. This invention also introduces portability of client device and client address. The flexibility enables plug-and-play interworking at the optical network edge and facilitates future extension to dynamic optical client address assignment and management.

The address registration and resolution scheme includes the capability to enable address registration over all O-UNI signaling channel configurations, no matter whether the signaling is in-band in-fiber, out-of-band in-fiber or out-of-band out-of-fiber. A further advantage of the proposed scheme is that it enables address registration for both direct service invocation and third-party signaling O-UNI configurations. Yet a further advantage of the disclosed technique is that it enables address registration in a third-party O-UNI signaling configuration. The present solution additionally simplifies the signaling system configuration, reduces hardware/software cost, and ensures optical client device mobility and client-layer address portability. Further advantages of the disclosed technique include the introduction of flexibility for optical access service and access link protection and enablement of extension to optical addressing services to automatic address registration, resolution and dynamic address allocation.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A method for intelligent address registration within an optical network, the method comprising the step of:
    sending a registration request from a client-side optical user-network interface agent to a network-side optical user-network interface agent, wherein the registration request includes a client layer address to be registered and an identity of an addressable entity;
    checking the registration request with the network-side optical user-network agent and creating an association by retrieving an optical network administered address and creating a mapping between the client layer address and optical network administered address; and
    forwarding the association to an optical network intelligent routing protocol for distribution over the network.

2. The method of claim 1, further comprising performing the step of resolution upon inquiry from a remote peer.

3. The method of claim 1, wherein the identity of the addressable entity includes at least a client ID and a client port ID.

4. The method of claim 3, wherein the identity of the addressable entity further includes a channel ID.

5. The method of claim 4, wherein the identity of the addressable entity further includes a sub-channel ID.

6. The method of claim 1, further comprising the step of creating a mapping between multiple client layer addresses and an optical network administered address.

7. The method of claim 1, further comprising the step of creating a mapping between multiple client layer addresses and multiple optical network administered addresses.

8. The method of claim 7, further comprising the step of maintaining scalability by creating a virtual optical network administered address representative of multiple optical network administered addresses.

9. An apparatus for performing address registration and resolution for an optical network, the optical network comprising at least an optical network element and a client device, the apparatus comprising:
    a client-side optical user-network interface agent having tools for formulating and forwarding an address request containing a client layer address associated with the client device and an identity of an addressable entity associated with the optical network element;
    a network-side optical user-network interface agent to receive the request from the client-side optical user-network interface agent, formulating an address association based on the request, and forwarding the address association, wherein the address association is formulated by retrieving an optical network administered address and creating a mapping between the client layer address and optical network administered address;
    an optical network intelligent routing protocol capable of receiving the address association formulated by the network-side optical user-network interface agent and propagating the address association.

10. The apparatus of claim 9, further comprising tools for removing a client device from the network.

11. The apparatus of claim 9, further comprising apparatus to perform address resolution upon inquiry_for the optical network administered address associated to the client layer address.

12. The apparatus of claim 9, wherein the identity of the addressable entity includes at least a client ID and a client port ID.

13. The apparatus of claim 12, wherein the identity of the addressable entity further includes a channel ID.

14. The apparatus of claim 13, wherein the identity of the addressable entity further includes a sub-channel ID.

15. The apparatus of claim 9, wherein the network-side optical user-network interface agent additionally comprises tools to create a mapping between multiple client layer addresses and an optical network administered address.

16. The apparatus of claim 9, wherein the network-side optical user-network interface agent further comprising tools to create a mapping between multiple client layer addresses and multiple optical network administered addresses.

17. The apparatus of claim 16, wherein the network-side optical user-network interface agent further comprises tools to maintain scalability by creating a virtual optical network administered address representative of multiple optical network administered addresses.

* * * * *